US011888276B2

(12) United States Patent

Tuerkekoele et al.

(10) Patent No.: US 11,888,276 B2

(45) Date of Patent: Jan. 30, 2024

(54) CONDUCTOR TERMINAL

(71) Applicant: WAGO Verwaltungsgesellschaft mbH, Minden (DE)

(72) Inventors: Muhammet Ali Tuerkekoele, Minden (DE); Markus Lorenschat, Porta Westfalica (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 30 days.

(21) Appl. No.: 17/590,534

(22) Filed: Feb. 1, 2022

(65) Prior Publication Data

US 2022/0247122 A1 Aug. 4, 2022

(30) Foreign Application Priority Data

Feb. 3, 2021 (DE) ..................... 10 2021 102 477.3

(51) Int. Cl.
*H01R 4/48* (2006.01)

(52) U.S. Cl.
CPC ................................ *H01R 4/48365* (2023.08)

(58) Field of Classification Search
CPC .................................................... H01R 4/4836
See application file for complete search history.

(56) References Cited

U.S. PATENT DOCUMENTS 3,891,297 A * 6/1975 Poliak .................... H01R 4/489 439/807
6,336,824 B1 1/2002 Sorig
8,251,738 B2 8/2012 Heckert et al.
8,734,192 B2 * 5/2014 He ......................... H01R 4/489 439/815
8,998,634 B2 4/2015 Koellmann
9,263,809 B2 * 2/2016 Assif ........................ H01R 9/24
10,439,300 B1 10/2019 Ferderer
2022/0109254 A1 * 4/2022 Kloppenburg ........... H01R 9/24

FOREIGN PATENT DOCUMENTS

| | | | |
|---|---|---|---|
| DE | 29920231 | U1 | 4/2001 |
| DE | 202007002061 | U1 | 5/2007 |
| DE | 102007050683 | A1 | 4/2009 |
| DE | 202008014469 | U1 | 3/2010 |
| DE | 202011050916 | U1 | 11/2012 |
| DE | 102016115490 | A1 | 2/2018 |
| DE | 102018126469 | B3 | 3/2020 |
| JP | H11317249 | A | 11/1999 |

* cited by examiner

*Primary Examiner* — Ross N Gushi

(74) *Attorney, Agent, or Firm* — Muncy, Geissler, Olds & Lowe, P.C.

(57) ABSTRACT

A conductor terminal, including at least one spring-force clamping connection for connecting an electrical conductor, the spring-force clamping connection having a busbar and a clamping spring, The clamping spring having a clamping leg, which, together with the busbar, forms a clamping point for the electrical conductor, and including an actuating element, the actuating element having a displaceably supported contact part, and the clamping point being able to be opened by a pushing movement of the contact part oriented in the direction of the clamping leg, the actuating element including an actuating part, rotatably supported around a first rotation axis and coupled with the contact part, by means of which the pushing movement of the contact part may be generated with the aid of a rotational movement of the actuating part.

22 Claims, 6 Drawing Sheets

CONDUCTOR TERMINAL

This nonprovisional application claims priority under 35 U.S.C. § 119(a) to German Patent Application No. 10 2021 102 477.3, which was filed in Germany on Feb. 3, 2021, and which is herein incorporated by reference.

BACKGROUND OF THE INVENTION

Field of the Invention

The present invention relates to a conductor terminal, including at least one spring-force clamping connection for connecting an electrical conductor, the spring-force clamping connection having a busbar and a clamping spring, the clamping spring having a clamping leg, which, together with the busbar, forms a clamping point for the electrical conductor, and including an actuating element, the actuating element having a displaceably supported contact part, and the clamping point being able to be opened by a pushing movement of the contact part oriented in the direction of the clamping leg.

Description of the Background Art

Conductor terminals are known, for example, with pushbutton actuation, i.e., the actuating element is in this case a manually actuateable, displaceable pushbutton, as in, for example, Series 2202 conductor terminals from the applicant's company.

SUMMARY OF THE INVENTION

It is therefore an object of the present invention to provide an even further improved conductor terminal of the type mentioned at the outset.

In the case of a conductor terminal, the actuating element can have an actuating part, which is rotatably supported around a first rotation axis and coupled with the contact part, with the aid of which the pushing movement of the contact part in a push direction (S) may be generated with the aid of a rotational movement of the actuating part. An easy and ergonomically operated actuation of the conductor terminal is provided by the invention, which is, in particular, favorable for an intuitive operation of the actuating element. The entire actuating mechanism may be implemented relatively easily and cost-effectively, for example with the aid of a contact part movable linearly and/or in an arc-shaped manner, and an actuating part rotatably coupled therewith.

A locking function may be added to the mechanism, so that an automatic holding of the actuating element in an open position may be provided, in which the clamping point is opened by the actuating element. This may be advantageously combined with an easily perceivable indication of the open position, for example by means of a corresponding labeling, symbols or surface condition of a manual actuating surface of the actuating part, which is visible from the outside. For example, the actuating part may have a slot or a groove on the actuating surface, so that a manual actuating tool, for example a screwdriver, may be easily placed thereon to carry out the manual actuation of the actuating part. The receiving slot or the groove indicates, via the corresponding rotational position, whether the actuating element is in the open position or the closed position.

In the case of the pushing movement, either a pressure force or a tensile force may be transferred to the clamping leg, depending on the design of the actuating mechanism.

For example, the actuating element may be designed as a manually actuated rotary pushbutton.

It is provided that the actuating element can have a multi-part design, at least the contact part and the actuating part being designed as separate components. In this way, a cost-effective manufacturing of the conductor terminal may be combined with an easy assembly of the individual parts. Alternatively, a 2K injection-molding technology is also conceivable for manufacturing the actuating element.

The contact part may be essentially not rotatable around the first rotation axis. Accordingly, the contact part is essentially rotatably fixedly supported with respect to the first rotation axis. Friction effects between the contact part and the clamping spring are minimized hereby.

The first rotation axis can intersect the contact part. For example, the actuating mechanism according to the invention significantly differs hereby from a known lever actuation of a conductor terminal. The contact part may have a pressure piece, which acts directly upon the clamping leg during the pushing movement, and a coupling section, at which the contact part is coupled with the actuating part. For example, the first rotation axis may intersect the coupling section of the contact part. The pressure piece may also be arranged at a distance from the first rotation axis.

The contact part can have a cylindrical bearing surface, with the aid of which the contact part is displaceably supported on the actuating part. Accordingly, the contact part may be simultaneously used for fixing and supporting the actuating part, so that no separate elements are necessary for fastening and supporting the actuating part. For example, the actuating part is rotatably supported on the coupling section of the contact part. The contact part may have a cylindrical bearing surface, on which the actuating part is rotatably supported.

The contact part may have a cylindrical body for this supporting of the actuating part on the contact part. The actuating part may have a cylindrical hollow space designed as a mating piece, with which the cylindrical body engages at least in sections. In this way, the actuating part is rotatably supported on the cylindrical body via its cylindrical hollow space. The actuating part thus at least partially surrounds the cylindrical body.

The actuating part can be coupled with the contact part via a feed mechanism, which is configured to convert a rotational movement of the actuating part into a pushing movement of the contact part, in particular a predominantly linear pushing movement. A feed mechanism of this type may be implemented easily and cost-effectively and with a compact specific embodiment. For example, the feed mechanism may be designed in the manner of a thread or in the form of the gate pin guide explained in greater detail below. The feed mechanism may be designed either with or without self-locking. The pushing movement may also at least partially follow a curved or arc-shaped contour.

The feed mechanism can include a gate pin guide, which has a push surface for contacting the pin, which runs at an oblique angle with respect to the push direction of the contact part. In this way, the actuating mechanism, including the actuating part and the contact part, may be easily mounted and permits a reliable conversion of a rotational movement at the actuating part into a pushing movement at the contact part. The aforementioned angle may be, for example, in the range from 30 to 60 degrees relative to the push direction of the contact part, for example approximately 45 degrees. For example, the gate may be arranged with the push surface on the actuating part, and the pin may be arranged on the contact part, for example on the cylindrical body thereof. However, the assignment may also be reversed.

The gate pin guide can have a slot-like or pocket-like positive guidance for the pin. In this way, the pin is surrounded by the slot-like positive guidance on both sides in the push direction, so that the contact part may be actively moved in both directions by a rotation of the actuating part, depending on the rotational direction, i.e., from the closed position into the open position and from the open position into the closed position. In the slot-like design, the positive guidance is formed by a slot, which extends through a lateral surface of the coupling area of the actuating part into the hollow space of the actuating part.

The gate pin guide can have a recess for receiving the pin, at least in an end area of the push surface or in an area in the profile of the push surface, by means of which the contact part is lockable in at least one position of the pushing movement, in particular in the open position. A parking position, as it were, is provided hereby for the pin in the open position, so that the actuating element is held in the open position, i.e., the restoring force of the clamping spring does not effectuate a restoration of the actuating element. The recess for receiving the pin may extend from the push surface, for example in a direction, in which the force of the clamping leg acts upon the contact part.

The recess can have an inclined, ramp-like contour with respect to the push surface. In this way, a contact over a wide area is created between the pin and the edge surfaces of the recess, so that a high single-point stressing of the material is avoided.

The conductor terminal can include an insulating housing, which has a conductor insertion opening for inserting an electrical conductor in a conductor insertion direction. The electrically conductive parts of the conductor terminal are shielded from the surroundings hereby. A high operating safety of the conductor terminal is achieved hereby, and undesirable short-circuits are avoided.

The contact part can be displaceably supported on a detent contour or sliding contour of the insulating housing. The contact part may therefore be designed in the manner of a slide, which may be moved back and forth on the detent contour or the sliding contour. For example, the contact part may be supported on the detent contour or sliding contour via its pressure piece.

The pressure piece of the contact part can be arranged between the clamping leg and the detent contour or the sliding contour in an open position of the clamping point.

The detent contour can be designed as an elongated guide rail, the elongated guide rail having a height offset. Due to the height offset, an engagement function may be implemented to engage the contact part in the open position. If the contact part reaches the area of the guide rail with the height offset, at least one section of the contact part changes, for example the pressure piece changes its relative height position in the insulating housing.

The contact part may be held against the detent contour in a clamping position when the clamping point is open, under the force force effect of the clamping leg. In this way, a holding of the actuating element in the open position may also be implemented without the parking pocket mentioned above.

The rotation angle of the actuating element around the first rotation axis can be limited by end stops, for example to a rotation angle of approximately 90 degrees. The rotation angle may generally be limited by the end stops to a value of 60 to 120 degrees.

The actuating part may have a manual actuating surface, which may be actuated, for example, by hand or with the aid of an actuating tool. For example, the actuating surface may have a receiving slot for actuation with the aid of an actuating tool, at which the actuating tool may be placed. The present rotational position of the actuating part may also be indicated by the receiving slot.

The actuating element may be arranged essentially in parallel to the conductor insertion direction. The first rotation axis may be oriented essentially in parallel to the push direction and/or to the conductor insertion direction. The push direction may be oriented essentially in parallel to the conductor insertion direction. The clamping spring may have a contact leg. A spring bend may be arranged between the contact leg and the clamping leg. The clamping leg may be formed, for example, essentially in the shape of a V.

The clamping leg may be oriented transversely, in particularly at an incline, to the push direction when the clamping position is open and/or when the clamping position is closed. For example, an angle in the range of 15 to 90 degrees may be formed between the clamping leg and the push direction, the clamping leg pointing with its free end in a direction facing away from the actuating part. For example, the clamping leg may intersect the push direction when the clamping point is closed, at least if no electrical conductor is arranged at the clamping point.

The clamping leg can have a clamping edge at its free end for fixedly clamping the electrical conductor at the clamping point. The electrical conductor may be particularly reliably fixed art the clamping point or at the busbar hereby.

The actuating part can be fixed in the axial direction, in particular in the push direction of the contact part. This has the advantage that the actuating part does not change its position in the axial direction or in the push direction, in particular also not when the rotational movement of the actuating part is carried out for generating the pushing movement of the contact part. The actuating part is thus not displaceable in the axial direction or in the push direction.

The actuating element can be provided with a multi-part design. The displaceably supported contact part includes a pressure piece, which is flexibly deflectable with respect to a guide section of the contact part. This conductor terminal may be additionally refined with one or multiple of the embodiments indicated above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 2:
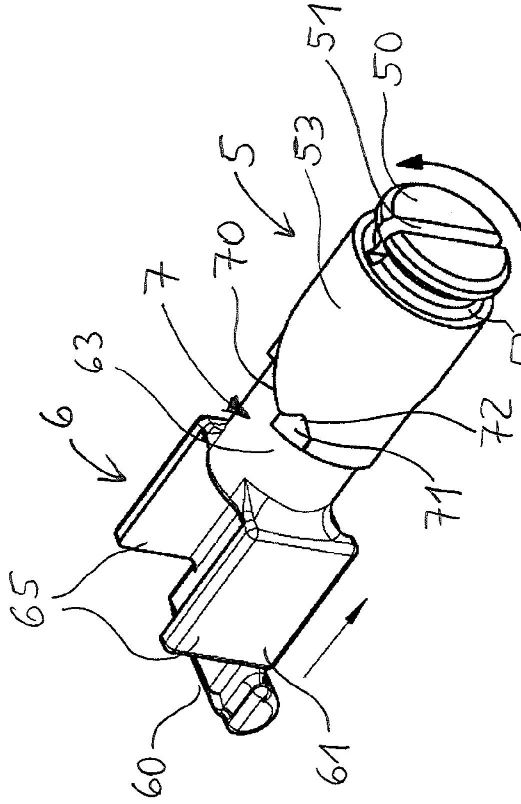
FIGS. 1 through 4 show an actuating element in different perspective views and actuating states.
Figure 4:
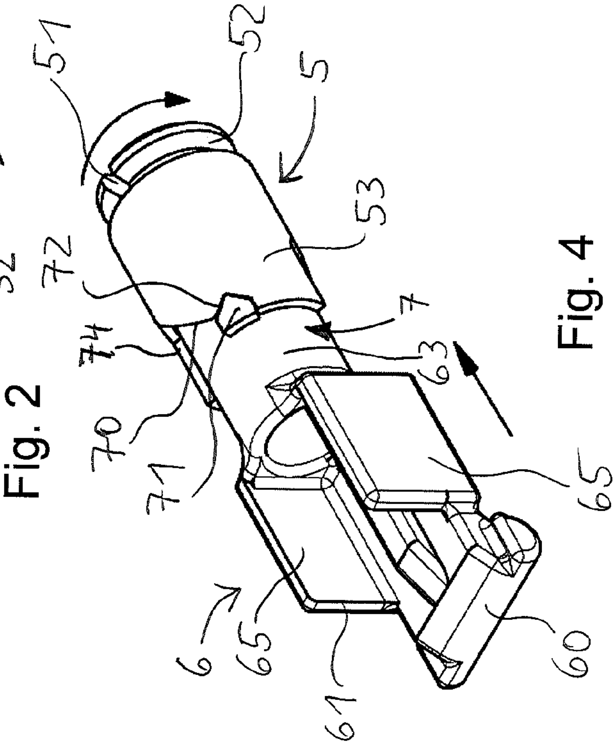
Figure 1:
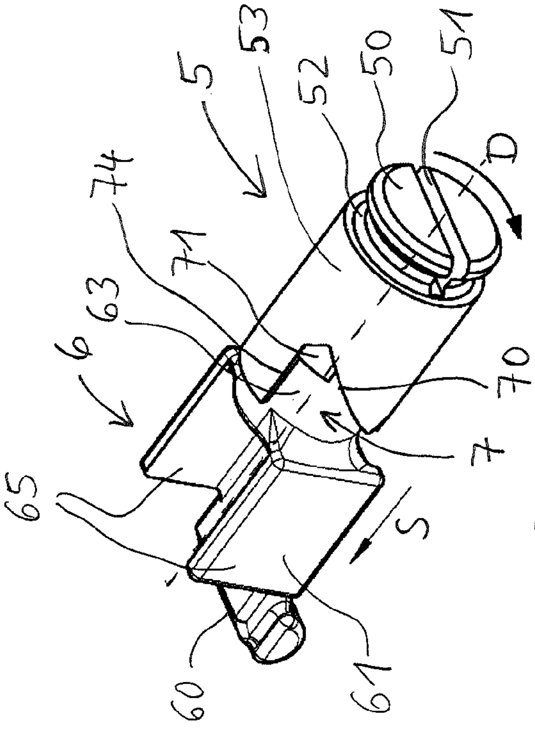
Figure 3:
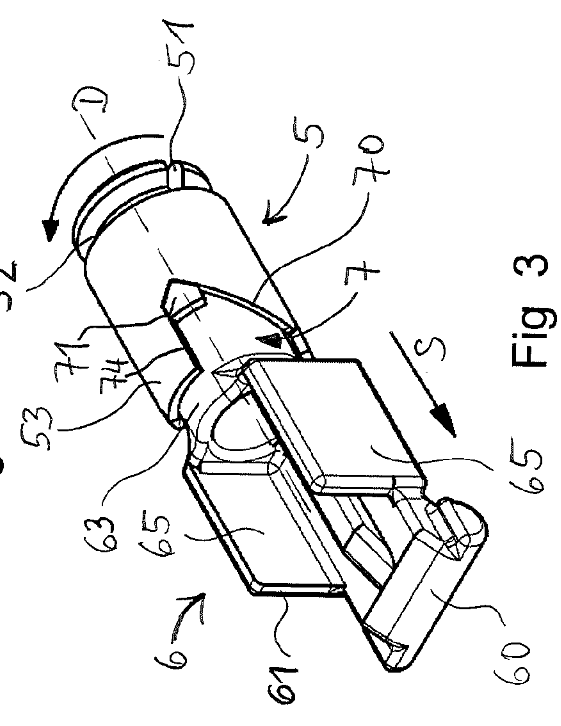

Based on FIGS. 1 through 4, an actuating mechanism for a conductor terminal is first to be explained, which includes an actuating element 5, 6, 7, which has an actuating part 5 and a contact part 6 as separate components. FIGS. 1 and 3 show actuating element 5, 6, 7 in the closed position, FIGS. 2 and 4 show it in the open position, from different observation directions in each case.

Actuating part 5 has a manual actuating surface 50, at which actuating element 5, 6, 7 may be actuated by manual actuation to transfer the spring-force clamping connection from the closed position into the open position or vice versa. A manual receiving slot 51 is formed on manual actuating surface 50, which is used to receive an actuating tool. Actuating part 5 transitions from manual actuating surface 50 into a coupling area 53 via a bearing area 52. Bearing area 52 is used for the rotational support of actuating part 5 in such a way that it is rotatably supported around a rotation axis D. Coupling area 53 is used for the mechanical coupling of actuating part 5 with contact part 6. In addition, an additional rotational support of actuating part 5 in the insulating housing of the conductor terminal is implemented by the outer surface of coupling area 53, which is preferably provided with an essentially cylindrical shape, as explained in greater detail below. Coupling area 53 also has a cylindrical hollow interior, which is designed to be open at end 50 facing away from the actuating surface.

Contact part 6 is used for contact with the clamping spring of the conductor terminal to deflect the clamping leg and hereby open the clamping point by means of a pushing movement of contact part 6. At the end facing away from actuating part 5, contact part 6 has a pressure piece 60, which is designed for contact with the clamping spring and has a corresponding contact surface. Pressure piece 60 is followed by a guide section 61 of contact part 6, by means of which contact part 6 is displaceable in the insulating housing of the conductor terminal but is not rotatably supported and guided. Guide section 61 is therefore not provided with a cylindrical design. Guide section 61 has side walls 65 on the left and right in each case, between which a free space is formed. A cylindrical body 63 of contact part 6 follows guide section 61 in the direction of actuating part 5, which is designed to be essentially cylindrical, at least on the outer circumference. Cylindrical body 63 at least partially extends into the cylindrical interior of coupling area 53. Contact part 6 is additionally guided hereby along the displacement direction.

Actuating element 5 is coupled with contact part 6 via a feed mechanism 7. A rotational movement of actuating part 5 is converted by feed mechanism 7 into a pushing movement of contact part 6, for example into a predominantly linear pushing movement in a push direction S. In the illustrated exemplary embodiment, feed mechanism 7 includes a gate pin guide, which has a push surface 70 on the gate side, which is in contact with a pin 71. Push surface 70 is arranged at an oblique angle in push direction S. If actuating part 5 is rotated around rotation axis D, push surface 70 slides along a contact surface of pin 71. Due to a rotational bearing of actuating part 5 fixed in push direction S, a pushing movement is generated by this rotation at contact part 6. Push surface 70 presses pin 71 away, as it were, during a rotational movement of actuating part 5 and thus also contact part 6, in push direction S. In the illustrated exemplary embodiment, pin 71 is fixedly arranged on contact part 6, in particular on cylindrical body 63. Push surface 70 is arranged on actuating part 5 for example, in that an inclined notch is introduced into coupling section 53 designed essentially as a cylindrical sleeve.

FIGS. 2 and 4 show the maximum lift of contact part 6 with respect to actuating part 5 in push direction S. This position corresponds to the open position of the spring-force clamping connection. It is apparent that, in one advantageous embodiment, a recess 72 is formed in an end area of push surface 70, into which pin 71 moves due to the restoring force of the clamping spring. Due to the design of the contour of recess 72 as a detent contour, an engagement of actuating part 5 in the open position is implemented. By rotating actuating part 5 in the opposite rotational direction, this engagement may be released again with a corresponding application of force, so that pin 71 returns to the area of push surface 70 and, in this way, the spring-force clamping connection may be transferred back in the closed position. In the closed position, pin 71 is in a trough or pocket formed by push surface 70 and a contact surface 74 extending in the direction of rotation axis D.

Figure 5:
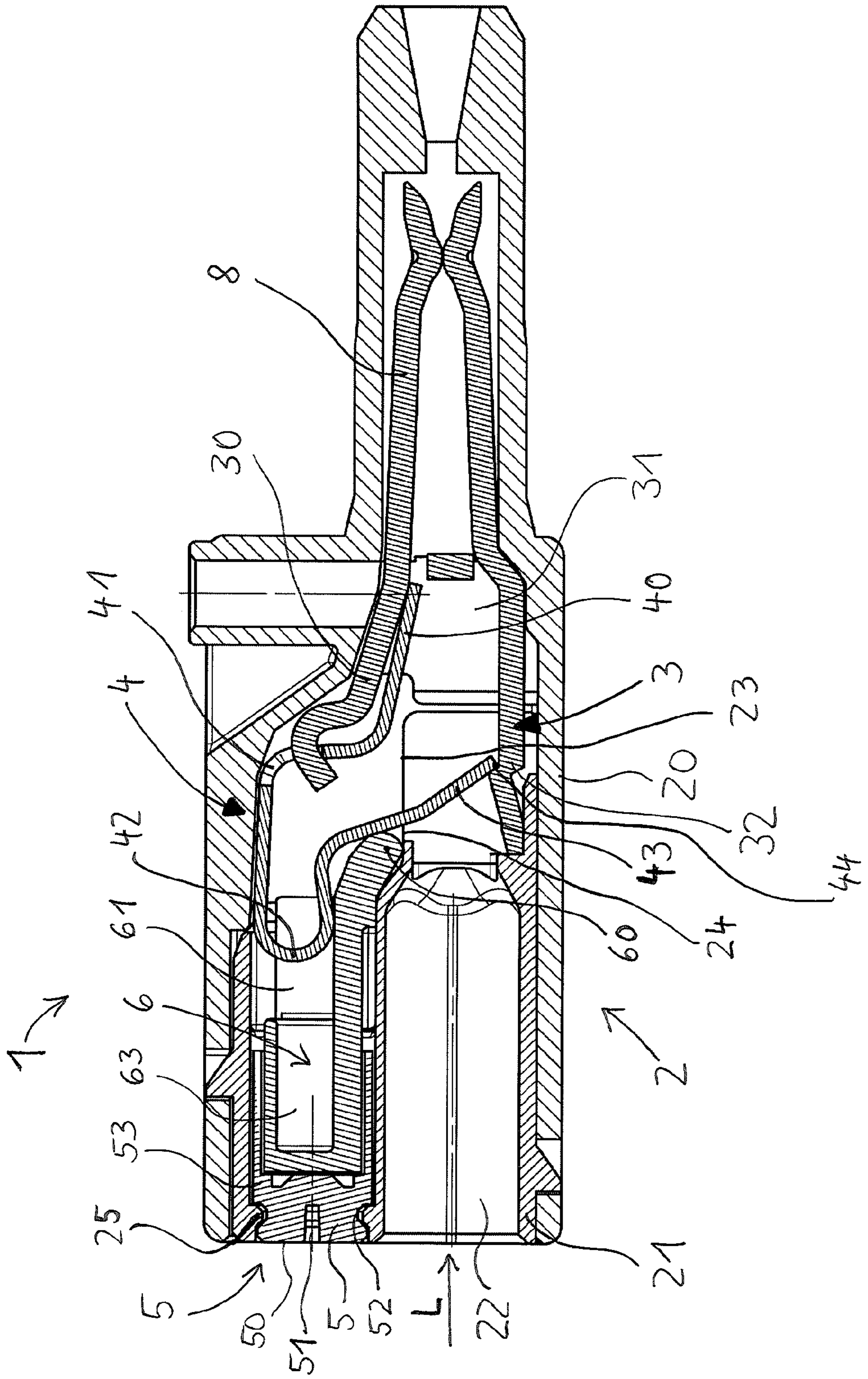
FIG. 5 shows a side sectional representation of a conductor terminal in the closed position.

FIG. 5 shows the actuating mechanism explained above, including actuating element 5, 6, 7 in conductor terminal 1, which is shown in the closed position. Conductor terminal 1 includes an insulating housing 2, which may be provided, for example, with a two-part design, including a main housing part 20 and a cover part 21. Cover part 21 is inserted into main housing part 20 from an opened side thereof and is fixedly coupled therewith, for example, via an engagement. Insulating housing 2 has a conductor insertion opening 22. An electrical conductor may be guided to the clamping point through conductor insertion housing 22 in a conductor insertion direction L. It is moreover apparent that actuating element 5, 6, 7 is arranged in insulating housing 2, for example in an area of cover part 21. Cover part 21 may also have conductor insertion opening 22.

Bearing area 52 of actuating part 5 may have a circumferential groove. It is apparent in FIG. 5 that actuating part 5, including the groove of bearing area 52, is fastened on a bearing contour 25, for example in that it engages therewith. Bearing contour 25 may be formed, for example, on cover part 21. Actuating part 5 is rotatably supported hereby around rotation axis D, but is unable to move in the longitudinal direction (push direction S). Actuating part 5 is thus not displaceable in the axial direction or in push direction S. For this purpose, cover part 21 has a receptacle corresponding to the cylindrical outer contour of actuating part 5 for receiving and guiding actuating element 5.

Pressure piece 60 of contact part 6 is supported on a sliding contour 23 of insulating housing 2. A busbar 3 and a clamping spring 4 are arranged in insulating housing 2 as parts of a spring-force clamping connection. The busbar has a contact area 32 for clamping an electrical conductor. Contact area 32 is connected to a spring holding area 30 of busbar 3 via a connecting wall 31. Busbar 3 may be manufactured from a metal part as a single piece with contact area 32 of connecting wall 31 and holding area 30. A plug contact 8, which is designed, for example, as a socket or pin contact, may also be arranged on busbar 3. Plug contact 8 is preferably connected to busbar 3, forming a single piece, but may also be designed as a separate component and be connected to busbar 3 via a detachable or preferably non-detachable connection, e.g., via a solder or welded joint.

Clamping spring 4 has a contact leg 40, a spring bend 42 adjacent to contact spring 40 and a clamping leg 43 adjacent to spring bend 42. The clamping point for the electrical conductor is formed between the free end of clamping leg 43 and contact area 32. Clamping leg 43 may have a clamping edge 44 at its free end for fixedly clamping the electrical conductor at the clamping point. Contact leg 40 is used to fix clamping spring 4, i.e., as a counter-bearing for the clamping force applied by clamping leg 43. The fixing of clamping spring 4 via contact leg 40 may be implemented, for example, in such a way that contact leg 40 abuts spring holding area 30, so that busbar 3 holds clamping spring 4 at both ends. In addition, a recess 41 may be present in the area of contact leg 40 for fixing clamping spring 4, with which spring holding area 30 engages with an angled free end.

Figure 6:
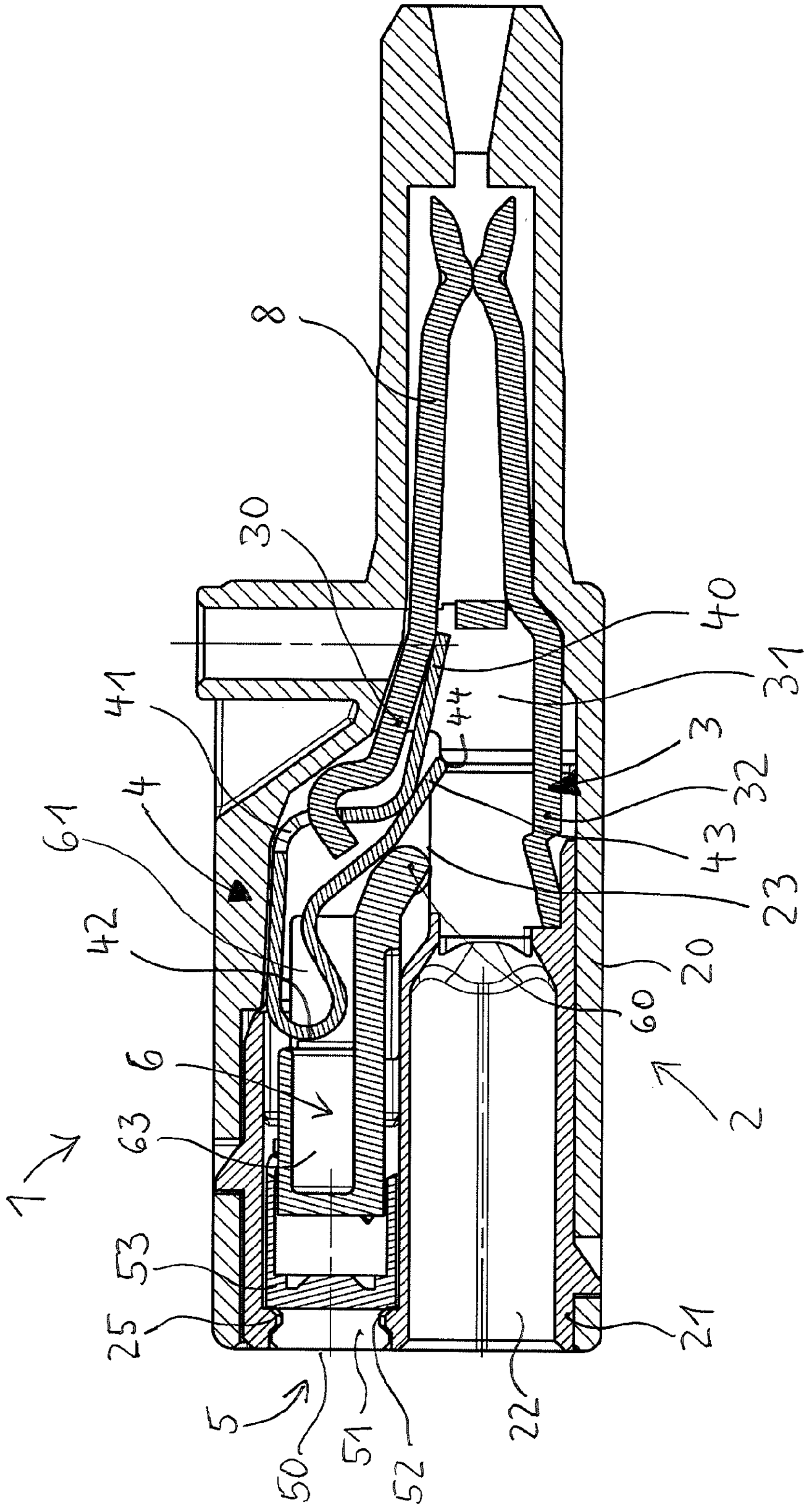
FIG. 6 shows the conductor terminal according to FIG. 5 in the open position.

Clamping spring 4 extends with a certain area, at least with spring bend 42, in a free space present between side walls 65 in guide section 61 of contact part 6. It is also apparent that pressure piece 60 abuts clamping leg 43. If actuating part 5 is now rotated around rotation axis D according to the arrow direction indicated in FIG. 1, contact part 6 is moved in push direction S, i.e., it is moved to the right in the illustration in FIG. 5. When contact part 6 reaches the open position, the state illustrated in FIG. 6 is adopted. It is apparent that clamping leg 43 of clamping spring 4 is deflected upwardly by pressure piece 60, i.e., it has been removed from contact area 32 of busbar 3. In this state, an electrical conductor may be easily guided to the clamping point or removed from the clamping point or conductor terminal 1. In this open position, actuating element 5, 6, 7 takes the position shown in FIGS. 2 and 4.

Figure 7:
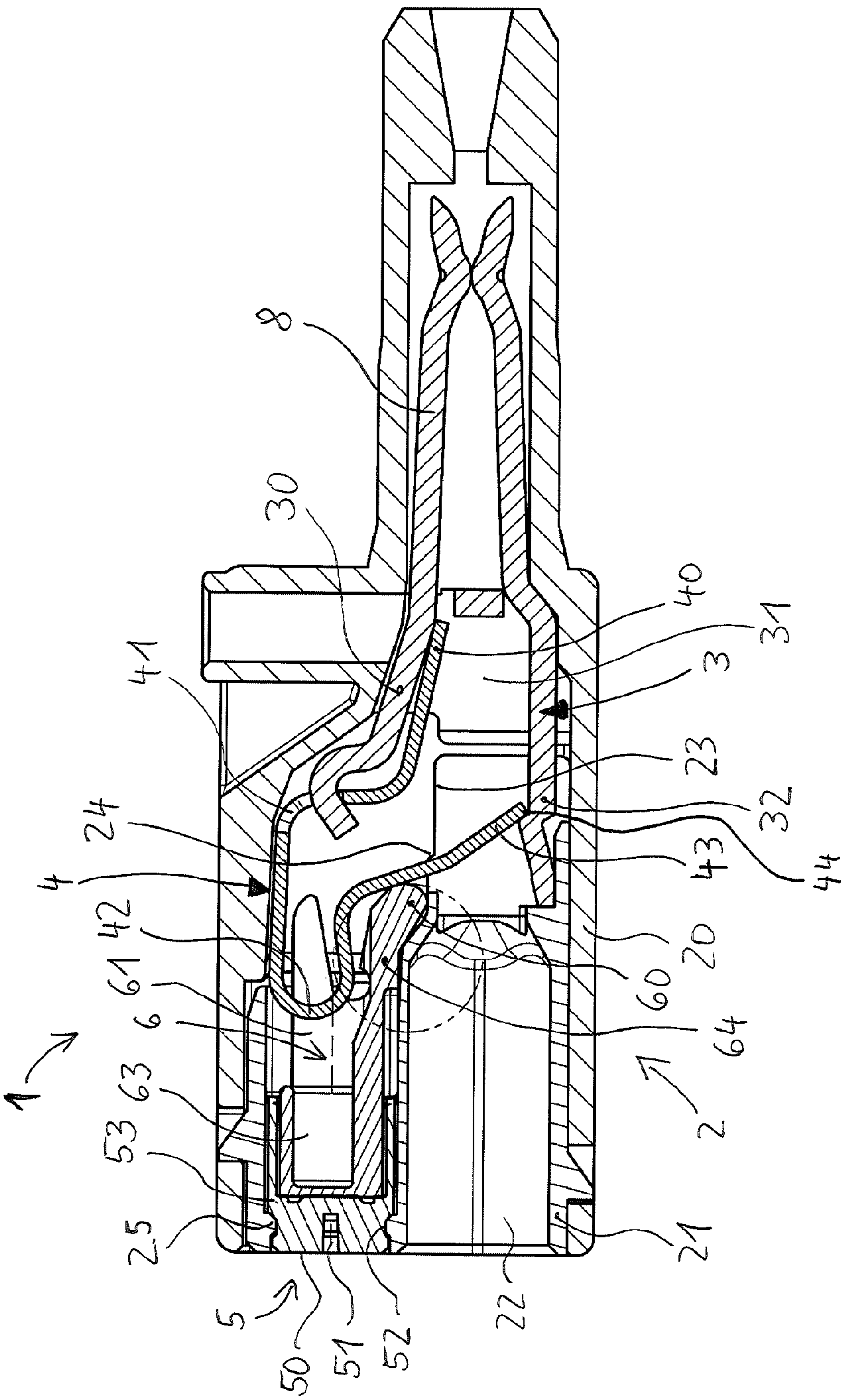
FIG. 7 shows a side sectional representation of a further specific embodiment of a conductor terminal in the closed position.

FIG. 7 shows an alternative specific embodiment of a conductor terminal 1, in which a modified contact part 6 is used, which is explained in greater detail below, based on FIGS. 9 and 10. A further difference compared to the specific embodiment in FIGS. 5 and 6 is that contact part 6 or pressure piece 60 is now supported on a special sliding contour of insulating housing 2, which in this case is designed as a detent contour having a height offset 24. It is apparent in FIG. 7 that contact part 6 as well as pressure piece 60 are situated in the same location as in the specific embodiment in FIG. 5. If contact part 6 is now moved into the open position, pressure piece 60 moves over height offset 24 and is then deflected into a slightly deeper location by the acting force of clamping spring 4, so that pressure piece 60 engages behind height offset 24. Due to the force applied to pressure piece 60 by clamping leg 43, contact part 6, and thus the entire actuating mechanism, is engaged in the open position. In this case, the gate pin guide may also be implemented without recess 72, since the locking in the open position is implemented via the engagement of pressure piece 60 at height offset 24.

Figure 8:
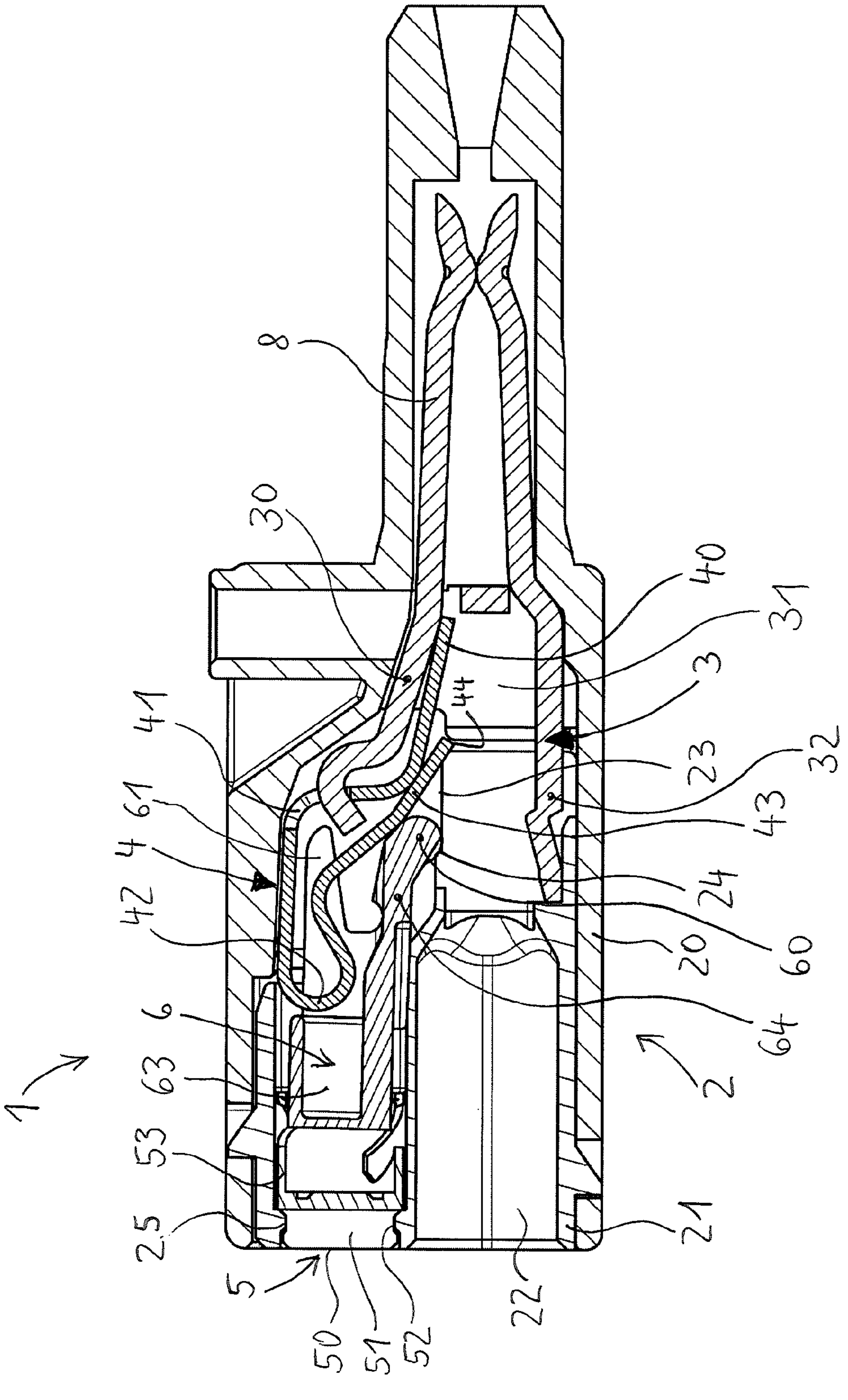
FIG. 8 shows the conductor terminal according to FIG. 7 in the open position.
Figure 10:
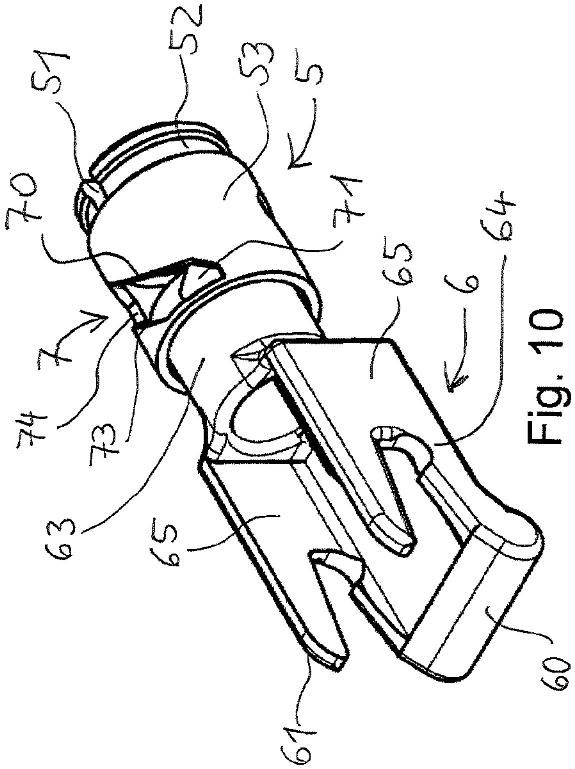
FIGS. 9 through 12 show further specific embodiments of actuating elements in perspective representations having different actuating states.
Figure 9:
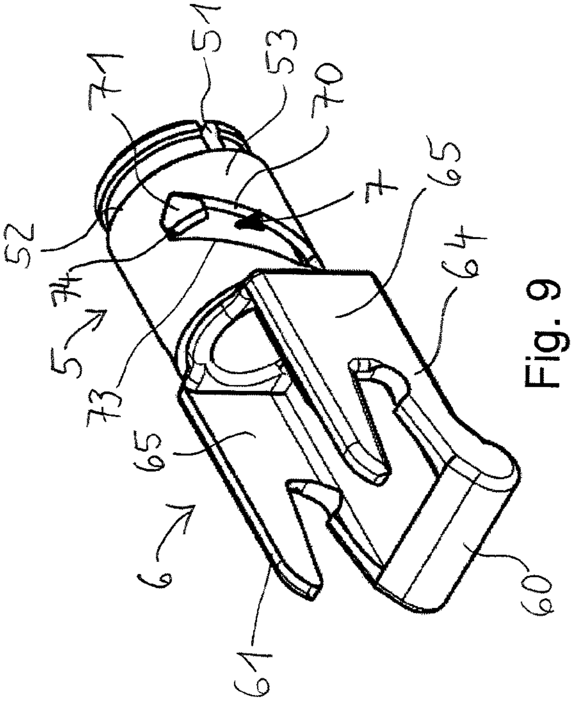

FIGS. 9 and 10 show actuating element 5, 6, 7 of conductor terminal 1 according to FIGS. 7 and 8, FIG. 9 illustrating the closed position and FIG. 10 showing the open position. It is apparent that, in contrast to the specific embodiment in FIGS. 1 through 4, gate pin guide 7 is designed as positive guidance, which is implemented in that not only is push surface 70 present on the one side of pin 71, but a pull surface 73 is also present on the opposite side. A slot-like opening is formed between push surface 70 and pull surface 73, in which pin 71 may be moved back and forth. Push surface 70 and pull surface 73 run at least predominantly in parallel to each other.

It is also apparent that contact part 6 does not have continuous side walls 65 in the area of bearing section 61, as in the specific embodiment in FIGS. 1 through 4, but instead has notches in side walls 65, by means of which a flexible joint 64 is formed, with the aid of which pressure piece 60 may be elastically deflected with respect to guide section 61 during the transition into the lower section of sliding contour 23, i.e. when height offset 24 is overcome.

Figure 12:
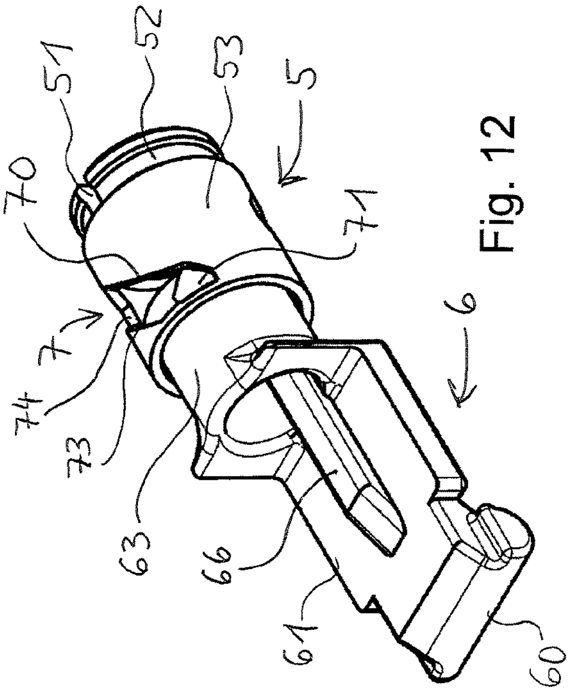
Figure 11:
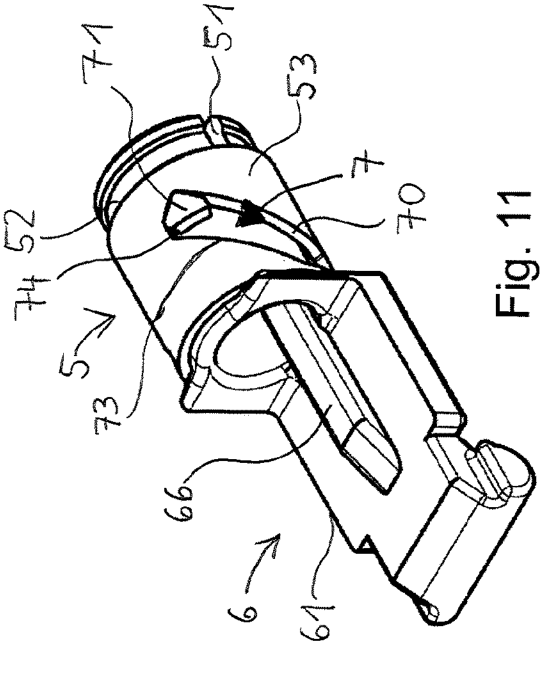

As illustrated in FIGS. 11 and 12, actuating element 5, 6, 7 may also be formed with a contact part 6, in which side walls 65 in bearing section 61 are largely or completely omitted. For the purpose of reinforcement and/or stabilization, a web 66 is arranged on guide section 61 of contact part 6, which is raised out of the surface of guide section 61 and is preferably molded on as a single piece. Web 66 at least predominantly overlaps guide section 61 in the longitudinal direction and projects into the cylindrical hollow space of cylindrical body 63.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor terminal comprising:

at least one spring-force clamping connection for connecting an electrical conductor, the spring-force clamping connection having a busbar and a clamping spring, the clamping spring having a clamping leg, which, together with the busbar, forms a clamping point for the electrical conductor; and an actuating element having a displaceably supported contact part, wherein the clamping point is opened by a pushing movement of the contact part in a push direction towards the clamping leg, wherein the actuating element has an actuating part, which is rotatably supported around a first rotation axis and is coupled with the contact part, via which the pushing movement of the contact part in the push direction is generated by a rotational movement of the actuating part, wherein the actuating part is coupled with the contact part via a feed mechanism, which is configured to convert the rotational movement of the actuating part into the pushing movement of the contact part, the pushing movement being predominantly linear, and wherein the feed mechanism includes a pin and a gate pin guide which has a push surface for contacting the pin, wherein the push surface runs at an oblique angle with respect to the push direction of the contact part.

2. The conductor terminal according to claim 1, wherein the actuating element is provided with a multi-part design, and wherein at least the contact part and the actuating part are separate components.

3. The conductor terminal according to claim 1, wherein the contact part is essentially not rotatable around the first rotation axis.

4. The conductor terminal according to claim 1, wherein the first rotation axis intersects the contact part.

5. The conductor terminal according to claim 1, wherein the contact part has a cylindrical bearing surface that is displaceably supported in the actuating part.

6. The conductor terminal according to claim 1, wherein the gate pin guide is a slot that guides the pin.

7. The conductor terminal according to claim 1, wherein the gate pin guide has a recess for receiving the pin, at least in an end area of the push surface or in an area in the profile of the push surface, via which the contact pact is lockable in at least one position of the pushing movement, the at least one position being an open position.

8. The conductor terminal according to claim 7, wherein the recess has an inclined ram-like contour in the direction of the push surface.

9. The conductor terminal according to claim 1, wherein the actuating part is fixed in an axial direction, which is the push direction of the contact part.

10. The conductor terminal according to claim 1, wherein the clamping leg is oriented at an incline to the push direction when the clamping point is in an open position and/or when the clamping point is in a closed position.

11. The conductor terminal according to claim 1, wherein a free end of the clamping leg has a clamping edge for fixedly clamping the electrical conductor at the clamping point.

12. The conductor terminal according to claim 1, wherein the conductor terminal includes an insulating housing, which has a conductor insertion opening for inserting an electrical conductor in a conductor insertion direction.

13. The conductor terminal according to claim 12, wherein the contact part is displaceably supported on a detent contour or a sliding contour of the insulating housing.

14. The conductor terminal according to claim 13, wherein the detent contour is an elongated guide rail having a height offset.

15. The conductor terminal according to claim 13, wherein the contact part is held in a clamping position on the detent contour under a force effect of the clamping leg when the clamping point is in an open position.

16. The conductor terminal according to claim 12, wherein the actuating element is arranged essentially in parallel to the conductor insertion direction.

17. The conductor terminal according to claim 12, wherein the first rotation axis is oriented essentially in parallel to the push direction and/or to the conductor insertion direction.

18. The conductor terminal according to claim 12, wherein the push direction is oriented essentially in parallel to the conductor insertion direction.

19. A conductor terminal comprising:

at least one spring-force clamping connection for connecting an electrical conductor, the spring-force clamping connection having a busbar and a clamping spring, the clamping spring having a clamping leg, which, together with the busbar, forms a clamping point for the electrical conductor; and an actuating element having a displaceably supported contact part, wherein the clamping point is opened by a pushing movement of the contact part in a push direction towards the clamping leg, wherein the actuating element has an actuating part, which is rotatably supported around a first rotation axis and is coupled with the contact part, via which the pushing movement of the contact part in the push direction is generated by a rotational movement of the actuating part, wherein the conductor terminal includes an insulating housing, which has a conductor insertion opening for inserting an electrical conductor in a conductor insertion direction, wherein the contact part is displaceably supported on a detent contour or a sliding contour of the insulating housing, and wherein a pressure piece of the contact part is arranged between the clamping leg and the detent contour or the sliding contour in an open position of the clamping point.

20. A conductor terminal comprising:

at least one spring-force clamping connection for connecting an electrical conductor, the spring-force clamping connection having a busbar and a clamping spring, the clamping spring having a clamping leg, which, together with the busbar, forms a clamping point for the electrical conductor; and an actuating element having a displaceably supported contact part, and wherein the clamping point is opened by a pushing movement of the contact part oriented in a direction of the clamping leg, wherein the actuating element is provided with a multi-part design, and wherein the displaceably supported contact part includes a pressure piece, which is flexibly deflectable with respect to a guide section of the contact part.

21. The conductor terminal according to claim 20, wherein a flexible joint is arranged between the pressure piece and the guide section.

22. The conductor terminal according to claim 20, wherein the actuating element has an actuating part, which is rotatably supported around a first rotation axis and is coupled with the contact part, via which the pushing movement of the contact part is generated by a rotational movement of the actuating part.

* * * * *